2,962,533
Patented Nov. 29, 1960

2,962,533

ORTHO-HYDROXYBENZOPHENONES WITH UN-SATURATED ETHER SUBSTITUENTS

William B. Hardy, Bound Brook, Warren S. Forster, Basking Ridge, and Ralph A. Coleman, Bound Brook, N.J., assignors to American Cyanamid Company, New York, N.Y., a corporation of Maine No Drawing. Filed Jan. 20, 1958, Ser. No. 709,753

17 Claims. (Cl. 260—591)

This invention relates to new ultraviolet absorbers, and more specifically, it relates to new o-hydroxybenzophenones of the formula:

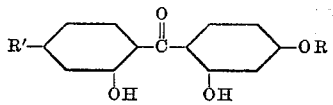

in which R is a radical of less than 7 carbons containing at least one carbon to carbon double bond, and R' is hydrogen or OR or alkoxy. These compounds are useful as ultraviolet absorbers.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbancy in the desired wave length range. As a measure of the degree of absorbancy, an absorption index may be used. This is a relation expressed as a figure to show an index of the degree of absorption per amount of material at a particular wave length (defined below). A high absorbancy index indicates greater absorption. However, for the most desirable ultraviolet protection, the high absorbancy index should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

We have found the benzophenones of the structure:

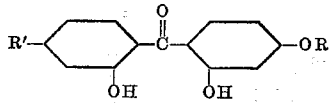

in which R is a radical of less than 7 carbons containing at least one carbon to carbon double bond, and R' is hydrogen, halogen, alkyl, OR, or alkoxy are good ultraviolet absorbers for general use which have the especially unique property of copolymerizing with monomers of the ethylenic type and consequently becoming an integral part of the polymer molecule. When they have been so copolymerized they are, unlike the ordinary UV absorber, unleachable from the polymer. This polymer thus not only contains its own "built in" protection against ultraviolet light, but also is thus usable without danger in contact with foods, etc., where ordinary polymers containing UV absorbers as mere additives are not usable. Further, such polymers do not lose their UV protection during hot molding because of evaporation of the protecting agent.

The compounds of our invention are prepared in various ways. A convenient general way is by the selective alkenylation of the requisite polyhydroxybenzophenone (i.e., either 2,4-dihydroxybenzophenone, 2,2',4-trihydroxybenzophenone, 2,2,4,4'-tetrahydroxybenzophenone) to replace the hydrogens on the para hydroxyls, but to leave the ortho hydroxyls untouched. This is achieved, under ordinary conditions of reaction, by using the proper stoichiometrical amount of alkenylating agent and no more, since the para hydroxyls are noticeably more reactive and are attacked first. The alkenylating agent is usually a halide of the desired alkenyl group. Examples of such agents (whose organic residue thus becomes the unsaturated radical R in the general formula above) are allyl chloride, allyl bromide, methallyl chloride and bromide, 2-chloroacrylonitrile, crotyl chloride and bromide, 2-chloroethyl vinyl ether, and the like. Similarly, a chlorohydrin can be reacted with the para hydroxy group to give a 4-hydroxy-alkoxy-benzophenone which is in turn reacted with allyl bromide or crotyl bromide, e.g., to give an alkenoxyalkoxy derivative of the benzophenone. Examples of such groups are allyloxyethoxy, crotoxyethoxy, methallyloxyethoxy, and allyloxypropoxy.

Alkenylation can also be accomplished by reaction with acetylenic compounds. These introduce an unsaturated radical with the double bonded carbon directly attached to the oxygen. Such acetylenic compounds include acetylene, propyne-1, butyne-1 and butyne-2, propyne-1, propyne-2, and the like. Alkenylacetylenes such as vinylacetylene can also be used, giving dienyloxybenzophenones such as 4-butadienyloxy-2, 2'-dihydroxybenzophenone and 4,4'-bis-(butadienyloxy)-2,2'-dihydroxybenzophenone. The acetylenic compounds can also be reacted with p-hydroxyalkyl-o-hydroxybenzophenones to give the corresponding p-alkenyloxyalkoxy or alkadienyloxyalkoxybenzophenone.

Another method which can be used to prepare the compounds of our invention is the preparation of a halogen substituted alkoxybenzophenone (the halogen being in the alkyl group) followed by treatment of this with alkali to form the ethylenic double bond in the side chain.

The new UV absorbers of our invention thus are 2,2'-dihydroxybenzophenones having at least one para position substituted by an alkylenoxy or an alkylenoxyalkoxy group. Where only one such para position is thus substituted, the other para position can be unsubstituted or can have an alkyl, halogen, or alkoxy group. The other positions in the benzophenone can also be substituted by halogens or alkyls. Some representative compounds of our invention are shown by the following table, based on the formula:

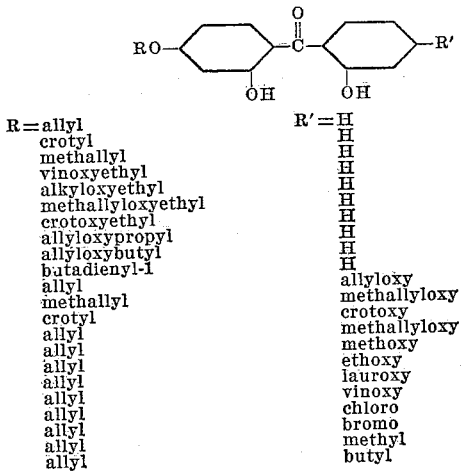

| R = | R' = |
|---|---|
| allyl | H |
| crotyl | H |
| methallyl | H |
| vinoxyethyl | H |
| alkyloxyethyl | H |
| methallyloxyethyl | H |
| crotoxyethyl | H |
| allyloxypropyl | H |
| allyloxybutyl | H |
| butadienyl-1 | H |
| allyl | allyloxy |
| methallyl | methallyloxy |
| crotyl | crotoxy |
| allyl | methallyloxy |
| allyl | methoxy |
| allyl | ethoxy |
| allyl | lauroxy |
| allyl | vinoxy |
| allyl | chloro |
| allyl | bromo |
| allyl | methyl |
| allyl | butyl |

It also includes such compounds as 2,2'-dihydroxy-4-allyloxy-5-methylbenzophenone, 2,2'-dihydroxy-4,4'-diallyloxy-5-methylbenzophenone, 2,2'-dihydroxy-4-allyloxy-5-chlorobenzophenone, and the like.

The new compounds of our invention can be incorporated in resins and plastics like any other UV absorber to give good protection. However, an especially important feature of our invention lies in the ability to copolymerize with the monomers for the various plastics and thus become an integral part of the resin molecule. Such copolymerization can be carried out with any monomer containing ethylenic double bonds, such as styrene, methyl styrene, ethyl styrene, propyl styrene, etc., acrylic acid and its amide, methacrylic acid, acrylonitrile, vinyl esters such as vinyl acetate and chloride, vinyl ethers such as vinyl butyral, and such compounds.

They can also be included with unsaturated modifiers of polyester resins. Such resins are prepared from unsaturated polyester resins prepared from alpha, beta unsaturated poly carboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such acids as phthalic, malonic, succinic, glutaric, sebacic and chlorinated polycarboxylic acids such as tetrachlorophthalic anhydride, hexachloroendomethylene tetrahydrophthalic acid, and the like, but in amounts less than a larger proportion of the total amount of polycarboxylic acid present.

Whenever available, the anhydrides of these acids may be used, or mixtures of the acids or mixtures of the anhydrides thereof.

As polyhydric alcohols which may be used to prepare the unsaturated polyesters, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6, and the like. Additionally, one could use glycerol, pentaerythritol, dipentaerythritol, and the like.

The modifier for polyester resins is usually a polymerizable material having a $CH_2=C<$ group. Amongst these polymerizable compounds are styrene, side chain substituted styrenes such as the alpha methylstyrene, alpha ethylstyrene, and the like, or ring substituted styrene such as ortho, meta and para-alkyl styrenes such as o-methyl styrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

Although the new benzophenones may be copolymerized with various types of monomers shown above the method will be illustrated in more detail in reference to copolymerization with styrene. Thus, in the formation of such a copolymer, the unsaturated benzophenone is mixed with the styrene and the polymer is formed by heating, using a conventional catalyst such as benzoyl peroxide. Depending on the amount of benzophenone used in relation to the amount of styrene monomer, only a portion of the benzophenone is actually incorporated in the monomer by copolymerization or chemical bonding. After the formation of the copolymer, the free or unreacted benzophenone may then be removed by extraction with a solvent in which the copolymer is involved. Or, if desired, the extraction of the unreacted unsaturated benzophenone may be omitted completely or in part, resulting in a composition containing varying amounts of unsaturated benzophenone, which by its presence may impart still more protective action to the composition.

This extraction also is a means of determining how much of the benzophenone is chemically bonded in the copolymer. Thus, the amount of ultraviolet absorber bonding in the copolymer may be determined by a weight difference or the amount may also be determined spectrophotometrically.

While our invention embraces all the unsaturated benzophenones of the type described, the allyl derivatives, derived from the tetrahydroxybenzophenone and the trihydroxybenzophenone have advantages of better miscibility with comonomers, as well as more efficient ultraviolet protection, over previously known ultraviolet absorbers, in addition to the great added advantage of copolymerizability.

This application is a continuation-in-part of our co-pending application, Serial No. 592,509, filed June 20, 1956, now U.S. Patent No. 2,853,521.

Our invention can be illustrated by the following examples in which parts are by weight unless otherwise specified.

*Example 1*

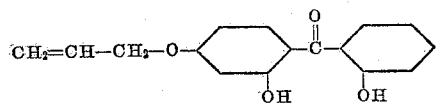

To a stirred mixture of 46.0 parts of 2,2',4-trihydroxybenzophenone, 27.6 parts of calcined potassium carbonate and 16.6 parts of potassium iodide in 120 parts of acetone is added 26.6 parts of allyl bromide. The mixture is heated at the reflux temperature, with stirring, until reaction is substantially complete. After 250 parts of water has been added, two layers form. An excess of 50% sodium hydroxide is added and 70 parts of petroleum ether is used to extract the alkaline insoluble oil. The aqueous alkaline solution is acidified and the solid which is formed is removed by filtration. Further crude product is obtainable by evaporation of the petroleum ether solution. The crude product can be purified by recrystallization from anhydrous alcohol.

*Example 2*

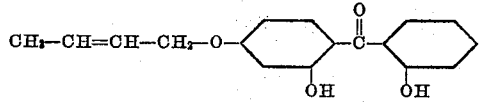

A mixture of 46 parts of 2,2',4-trihydroxybenzophenone, 33.8 parts of crotyl bromide, 30 parts of sodium carbonate, 80 parts of 95% alcohol and 30 parts of water is heated at the reflux temperature with stirring until reaction is complete. The mixture is drowned in 1000 parts of water, acidified with concentrated hydrochloric acid and cooled in an icebath. The solid which forms is removed by filtration and crystallized from methanol.

*Example 3*

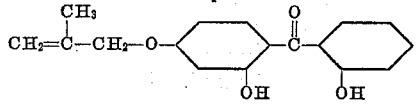

A mixture of 46 parts of 2,2',4-trihydroxybenzophenone, 22.4 parts of beta-methallyl chloride, 30 parts of sodium carbonate, 80 parts of 95% alcohol and 30 parts of water is stirred at the reflux temperature until the reaction is complete. After drowning the mixture in 1000 parts of water and acidified with concentrated hydrochloric acid, the solid which separates is removed by filtration. It is crystallized from methanol.

*Example 4*

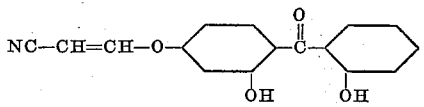

A mixture of 2.4 parts of 2,2',4-trihydroxybenzophenone, 11 parts of 2-chloroacrylonitrile, 15 parts of sodium carbonate, 80 parts of 95% alcohol and 30 parts of water is stirred at room temperature for a short period of time and then heated at the reflux temperature for an additional period until the reaction is complete. The mixture is then drowned in 700 parts of water and the drowned mixture is acidified with concentrated hydrochloric acid, whereupon a solid material separates and is removed by filtration. After repeated recrystallization from methanol, the product is obtained in the form of a pale yellow solid.

*Example 5*

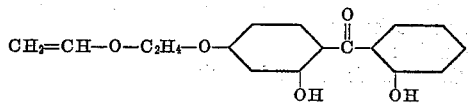

To a solution of 21.4 parts of 2,2',4-trihydroxybenzophenone in 125 parts of water containing 4 parts of sodium hydroxide is added 10.7 parts of 2-chloroethyl vinyl ether. The mixture is heated at the reflux temperature until the reaction is complete. It is then drowned in 1000 parts of water, and cooled in an icebath. The solid which separates is crystallized from methanol, giving the product in the form of light tan clear crystals.

*Example 6*

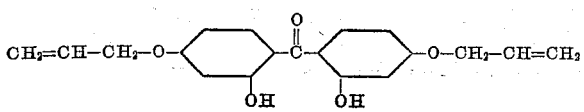

A mixture of 123 parts of 2,2',4,4'-tetrahydroxybenzophenone, 150 parts of sodium carbonate, 150 parts of allyl bromide, 400 parts of 95% alcohol and 200 parts of water is stirred at room temperature until the reaction is complete. After drowning in 1000 parts of water and acidifying with concentrated hydrochloric acid, the solid which forms is removed by filtration. This solid is purified by crystallization from 95% alcohol.

*Example 7*

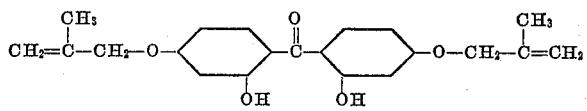

A mixture of 24.6 parts of 2,2',4,4'-tetrahydroxybenzophenone, 30 parts of sodium carbonate, 22.4 parts of beta-methallyl chloride, 80 parts of 95% alcohol, and 30 parts of water is heated at the reflux temperature until reaction is complete. After cooling and drowning in 800 parts of water the mixture is acidified with concentrated hydrochloric acid and the solid material is separated. It is purified by crystallization from methanol.

*Example 8*

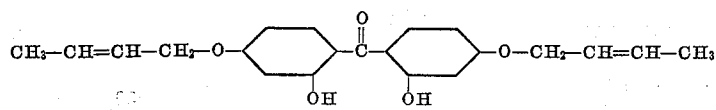

The procedure of Example 7 was followed, using an equivalent amount of crotyl bromide in place of the beta-methallylyl chloride. The product is purified by recrystallization from 95% alcohol.

*Example 9*

The solubility of 2,2'-dihydroxy-4,4'-diallyloxybenzophenone is compared with that of 2,2''-dihydroxy-4,4'-dimethoxybenzophenone.

|  | Diallyloxy Compound, g./100 g. solution | Dimethoxy Compound, g./100 g. solution |
|---|---|---|
| Benzene | 12.8 | 5.2 |
| Dioctyl phthalate | 3.2 | 1.3 |

The diallyloxy compound is incorporated into a polyvinylchloride composition using 0.1 part of the diallyloxy compound with 100 parts of polyvinylchloride, 50 parts of dicrotyl phthalate, 2 parts of Ba-Cd laurate and 1 part of triarylphosphite. The plastic composition is milled and molded into chips. A similar composition without the UV absorber is used as a control. The chips were exposed in a Fadeometer and the time for the 10th spot to develop was noted.

Time in Hr's for 10th spot
2,2'-dihydroxy-4,4'-diallylbenzophenone _____ 1030
Control (no UV absorber) _____ 290

*Example 10*

A mixture of 9 g. of styrene and 1 g. of 2,2'-dihydroxy-4,4'-diallyloxybenzophenone is heated in the presence of 0.1 g. of benzoyl peroxide in a sealed tube at 80° C. for 8 hours and 100° C. for 72 hours. The resulting copolymer is dissolved in benzene and precipitated by the addition of an excess of ethanol. It is then extracted with boiling ethanol for 3 hours whereupon all unreacted 2,2'-dihydroxy-4,4'-diallyloxybenzophenone is separated from the copolymer. The copolymer is found by spectrophotometric determination to contain about 1.5% of the copolymerizable UV absorber.

*Example 11*

Copolymers of styrene with various unsaturated hydroxybenzophenones are prepared by heating in a sealed tube, a mixture of 9 g. of styrene with 1 g. of the benzophenone in the presence of 0.01 g. of dibenzoyl peroxide. The temperature is increased from an initial temperature of 80° C. to about 120° C., over a six-day period, the samples being heated a total of 9 days. The resulting copolymer is removed from the sealed tube and added to benzene, using sufficient benzene so that approximately a 5% solution resulted. After the copolymer has completely dissolved, the solution is added slowly with agitation to an excess of methanol. After the mixture has stood for several hours, the solid product is removed by filtration, washed several times with methanol, dried, and then ground to a fine powder by ball-milling. The products are then analyzed for benzophenone content spectrophotometrically. For this determination a 0.1 g. sample is dissolved in 1000 ml. of toluene and spectrophotometric curves are determined on a Spectracord using a hydrogen light source. The curves are taken over a range from approximately 300 mu to 400 mu, the reference medium being toluene. The concentration of the benzophenone in the copolymer toluene solution is calculated by the formula:

$$c = \frac{D}{al}$$

where c is concentration in grams per liter
D is optical density
a is the absorptive coefficient
l is cell thickness in cm.

This concentration per liter divided by the weight of the copolymer samples per liter, multiplied by 100 is the percent ultraviolet absorber in the copolymer. Any remaining unreacted benzophenones are removed from the copolymer by extracting with 95% alcohol in a Soxhlet extractor. The amount of benzophenone extracted is determined periodically by spectrophotometric analysis. In all cases, the extraction is carried out until substantially no further benzophenone is extractable.

The following table summarizes the amount of several of these benzophenones in the copolymers before and after the alcohol extraction. The concentration of benzophenone in the copolymer before extraction is determined as described above. The concentration of benzophenone after extraction is the difference between the concentration in the unextracted copolymer and the amount in the alcohol extract. The efficiency of copolymerization is considered to be the percentage of monomeric benzophenone that has copolymerized.

| Name | Conc. (Percent) Benzophenone in Monomer Mixture | Conc. (Percent) Benzophenone in Copolymer before Extraction | Conc. Benzophenone in Copolymer after Extraction | Percent Efficiency of Copolymerization |
|---|---|---|---|---|
| 4,4'-diallyloxy-2,2'-dihydroxy-benzophenone | 10 | 1.45 | 1.34 | 13.4 |
| 4(2-vinyloxy ethoxy)-2-hydroxybenzophenone | 6.7 | 0.354 | (a) | a 5.33 |
| 4,4'-dimethallyloxy-2,2'-dihydroxy-benzophenone | 10 | 1.07 | 1.00 | 10.0 |
| 4,4'-dicrotoxy-2,2'-dihydroxy-benzophenone | 6 | 0.116 | (a) | a 1.98 | a Not extracted.

Example 12

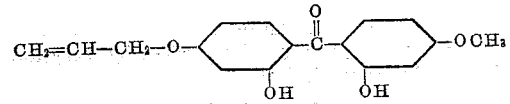

The procedure of Example 6 is followed using only 62 parts of allyl bromide. Before drowning the reaction mixture, 150 parts of dimethyl sulfate is added and the stirring is continued until this reaction is complete. The product is then isolated as in Example 6.

Example 13

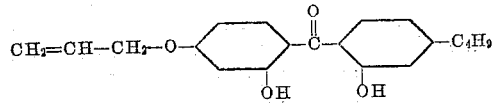

The procedure of Example 1 is followed, using an equivalent amount of 2,2',4-trihydroxy-4'-butylbenzophenone in place of the trihydroxybenzophenone. Similarly, the 4'-chloro compound is obtained when 2,2'-4-trihydroxy-4'-chlorobenzophenone is used.

Example 14

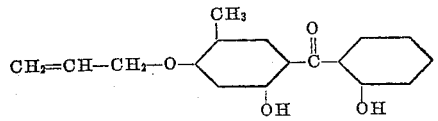

The procedure of Example 1 is followed using an equivalent amount of 2,2',4-trihydroxy-5-methylbenzophenone in place of the trihydroxybenzophenone.

Example 15

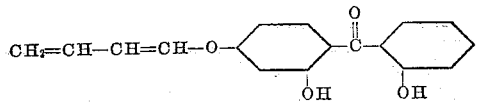

A mixture of 46.0 parts of 2,2',4-trihydroxybenzophenone and 8 parts of sodium hydroxide in 150 parts of dioxane is stirred while 52 parts of vinyl acetylene is added. The mixture is stirred at room temperature until the reaction is complete. It is then added to 250 parts of water and the product is isolated by extraction from the alkaline solution with petroleum ether and evaporation of the extract.

Example 16

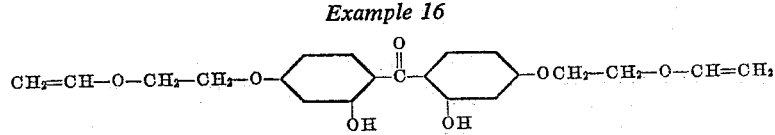

The procedure of Example 5 is followed replacing the trihydroxybenzophenone with an equivalent amount of 2,2',4,4'-tetrahydroxybenzophenone to give the product of the above formula.

We claim:
1. Compounds of the formula

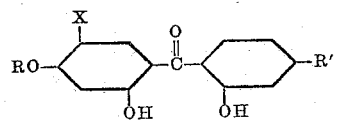

in which R is an open chain radical of less than seven carbons selected from the group consisting of alkenyl, alkadienyl, alkenyloxyalkyl and cyanoalkenyl, R' is selected from hydrogen, lower alkyl and halogen of atomic number between 16 and 36 and X is selected from hydrogen, lower alkyl and chloro.

2. Compounds of the formula

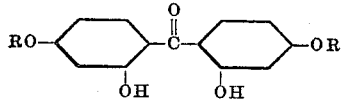

in which R is an open chain radical of less than seven carbons selected from the group consisting of alkenyl, alkadienyl, alkenyloxyalkyl and cyanoalkenyl.

3. The benzophenones of claim 1 in which R is an alkenyl group.

4. The compounds of claim 3 in which the said alkenyl is allyl.

5. The compounds of claim 3 in which the said alkenyl is methallyl.

6. The compounds of claim 3 in which the said alkenyl is crotyl.

7. The compounds of claim 1 in which the R is an alkenyloxyalkyl.

8. The compounds of claim 1 in which R is an alkadienyl group.

9. The benzophenones of claim 2 in which R is an alkenyl group.

10. The compounds of claim 2 in which R is an alkenyloxyalkyl.

11. The compounds of claim 2 in which R is an alkadienyl group.

12. 2,2'-Dihydroxy-4-allyloxybenzophenone.

13. 2,2'-Dihydroxy-4-vinoxyethoxybenzophenone.

14. 2,2'-Dihydroxy-4,4'-diallyloxybenzophenone.

15. 2,2'-Dihydroxy-4,4'-dimethallyloxybenzophenone.

16. 2,2'-Dihydroxy-4,4'-dicrotoxybenzophenone.

17. 2,2'-Dihydroxy, 4,4' - di(vinoxyethoxy) benzophenone.

References Cited in the file of this patent

UNITED STATES PATENTS

| | | |
|---|---|---|
| 2,682,559 | Stanley et al. | June 29, 1954 |
| 2,693,492 | Hoch | Nov. 2, 1954 |
| 2,853,521 | Hardy et al. | Sept. 23, 1958 |

OTHER REFERENCES

Tadros et al.: Chem. Abstracts, vol. 43, page 7469d (1949).